United States Patent [19]

Chateau et al.

[11] 4,120,171

[45] Oct. 17, 1978

[54] APPARATUS AND METHOD OF CONNECTING A FLEXIBLE LINE TO A SUBSEA STATION

[75] Inventors: Georges M. Chateau, Pau, France; Chester B. Falkner, Jr., Huntington Beach, Calif.

[73] Assignee: Societe Nationale Elf Aquitaine (Production), France

[21] Appl. No.: 759,031

[22] Filed: Jan. 13, 1977

[51] Int. Cl.² ............................................. F16L 1/04
[52] U.S. Cl. ................................... 405/169; 166/352
[58] Field of Search ................. 61/107, 110, 108, 111; 166/0.5, 0.6

[56] References Cited

U.S. PATENT DOCUMENTS

| | | | |
|---|---|---|---|
| 3,592,014 | 7/1971 | Brown et al. | 61/110 |
| 3,638,732 | 2/1972 | Huntsinger et al. | 166/0.6 X |
| 3,721,294 | 3/1973 | Nelson | 166/0.6 |
| 3,724,061 | 4/1973 | Schipper | 61/110 X |
| 3,973,625 | 8/1976 | Baugh | 166/0.6 |

*Primary Examiner*—Mervin Stein
*Assistant Examiner*—David H. Corbin
*Attorney, Agent, or Firm*—Poms, Smith, Lande & Glenny

[57] ABSTRACT

An apparatus for attaching a flexible line, such as a multiconductor electric cable for power and control circuits, a single flexible hose, or conventional flexible cables to a subsea station by remotely controlled means and without the assistance of divers or diver capsules or submarines. The apparatus includes a cable connecting frame structure upon which is pivotally mounted a socket-like container means which receives a receptacle means connected at one end of a flexible power cable or line. The frame structure is adapted to be releasably attached to the subsea station. A plug assembly is receivable by the socket-like container for electrical engagement with the receptacle means, and lock means holds the socket-line container in a selected position with respect to the subsea station. A method of connecting a flexible line to a subsea station in which a cable connecting frame structure carrying a socket-like container receiving a receptacle means provided at one end the power line is lowered to the subsea station by a running tool which has latched engagement with the frame structure and holds latch members on the frame structure in release position for reception of guide posts on the subsea station. Release of the running tool from its latched engagement with the frame structure provides latching of the frame structure to the guide posts so that the running tool may be retrieved. A method in which the running tool may also be used for retrieving the frame structure for service of the electrical receptacle means carried by the frame structure.

12 Claims, 8 Drawing Figures

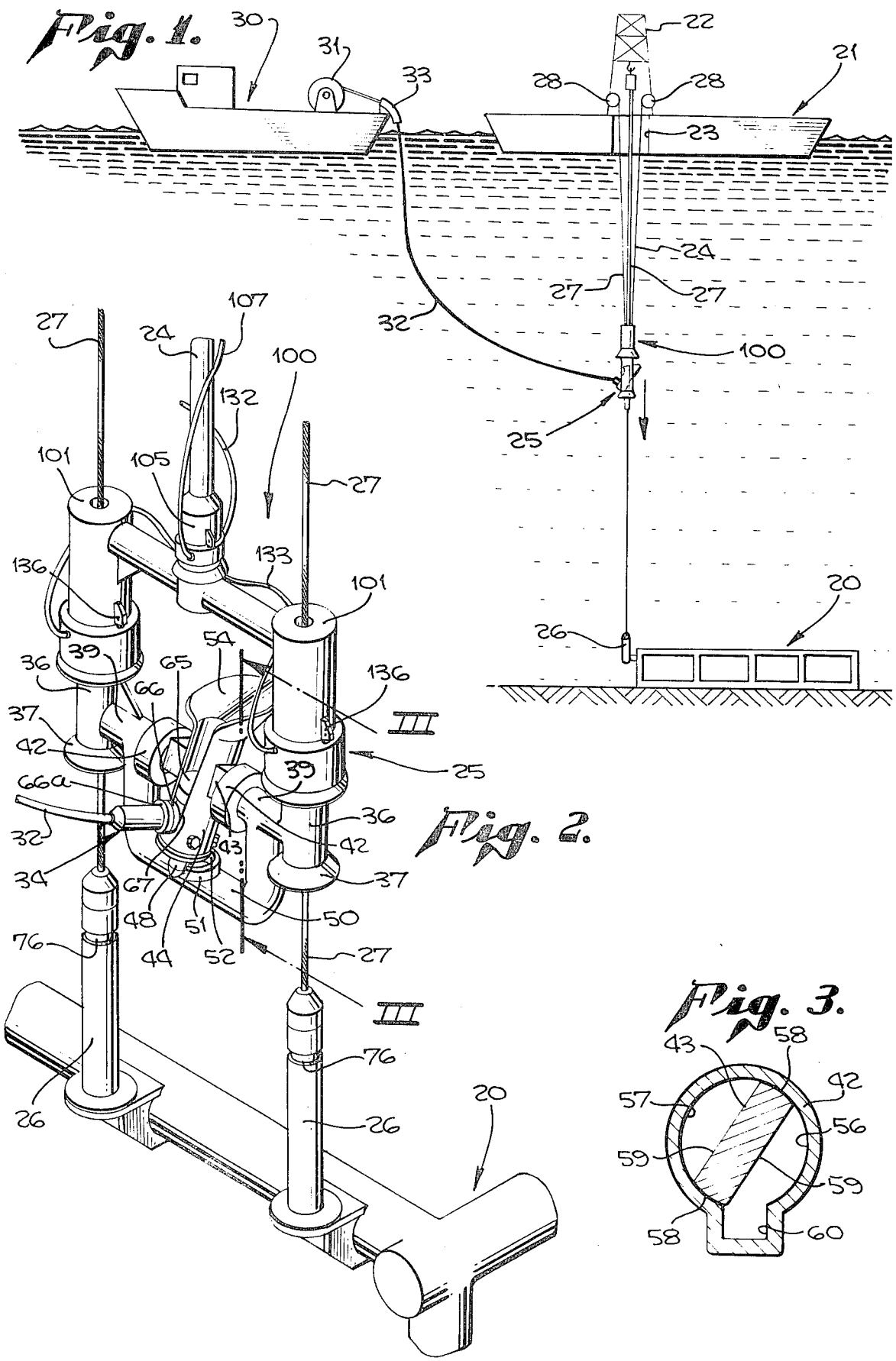

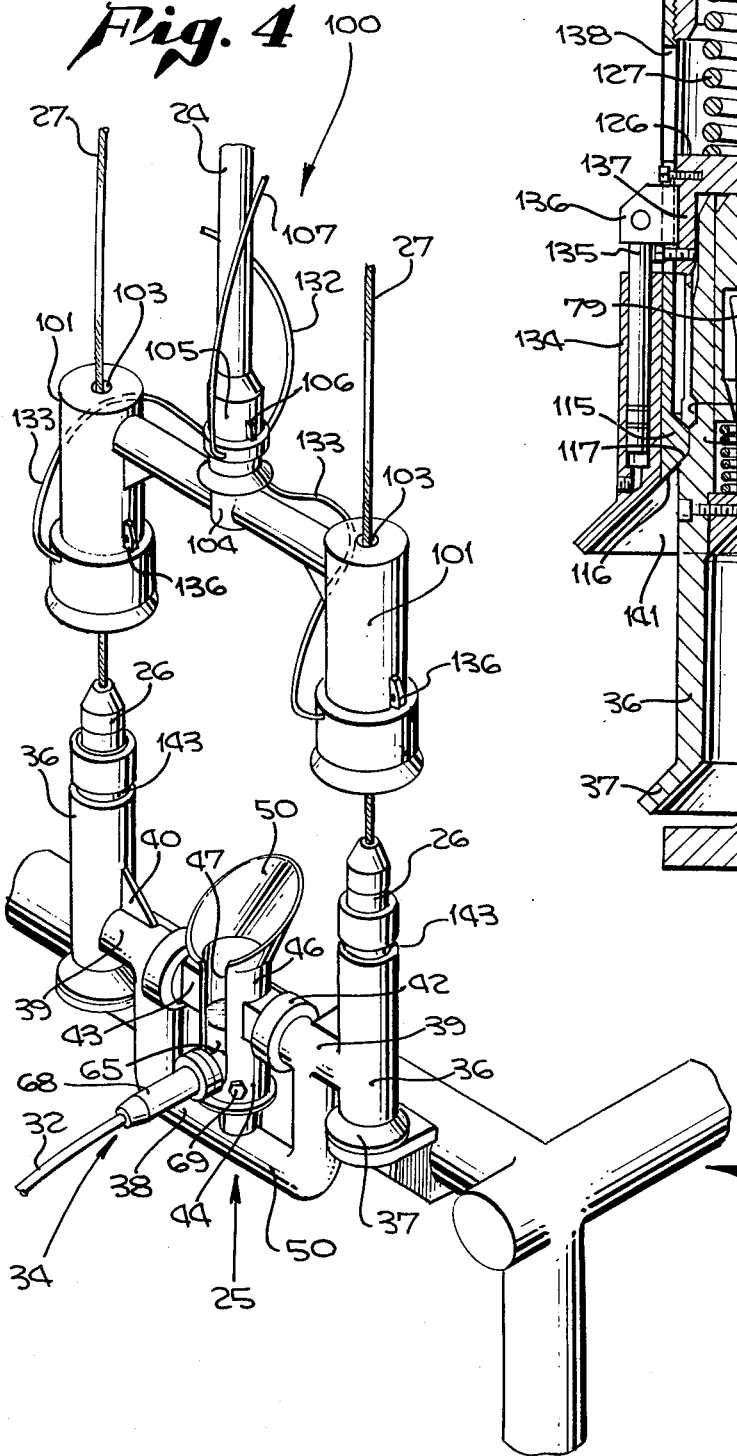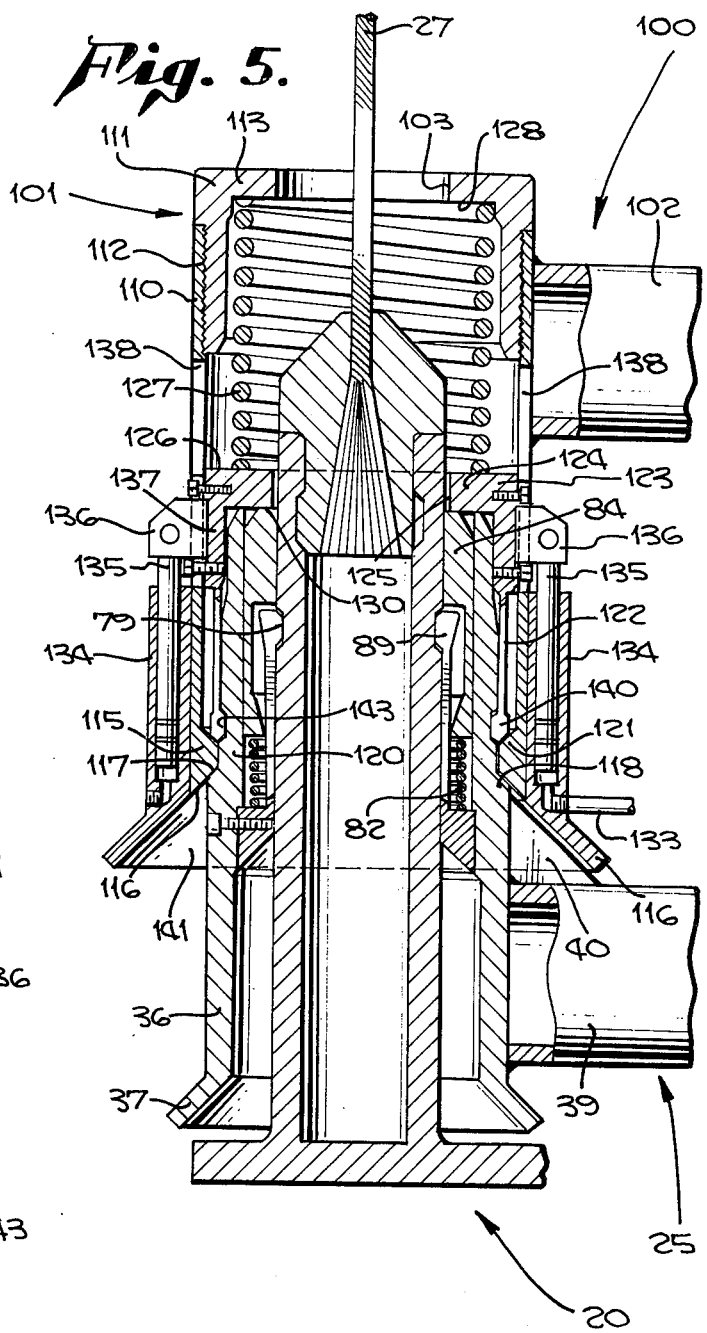

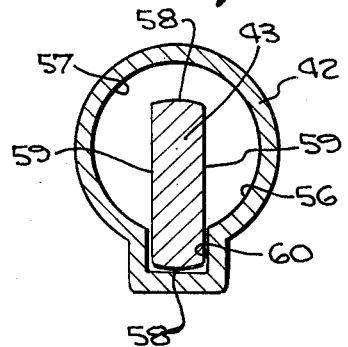
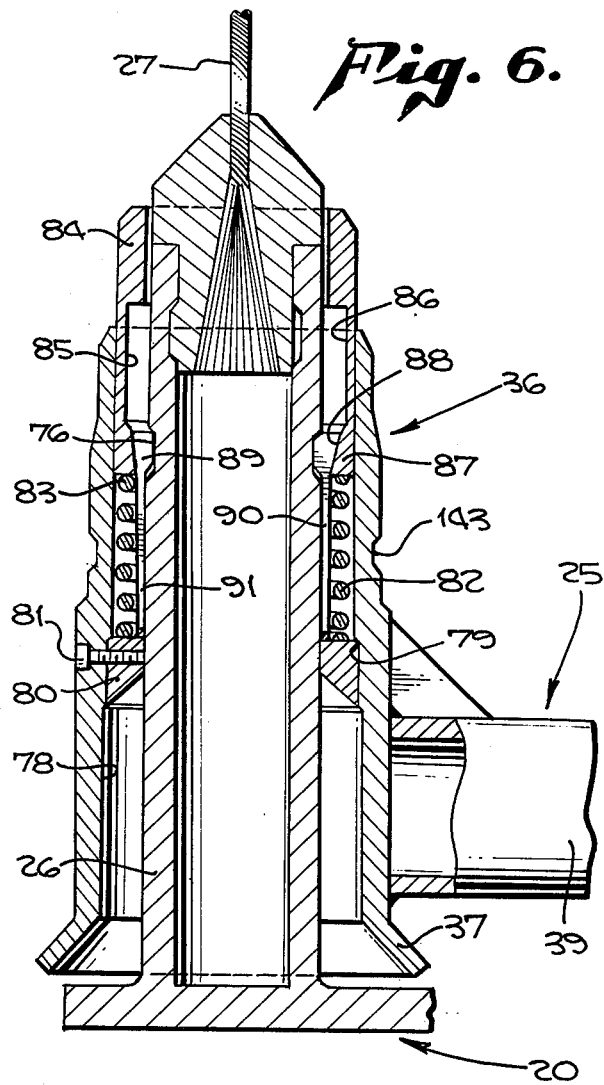
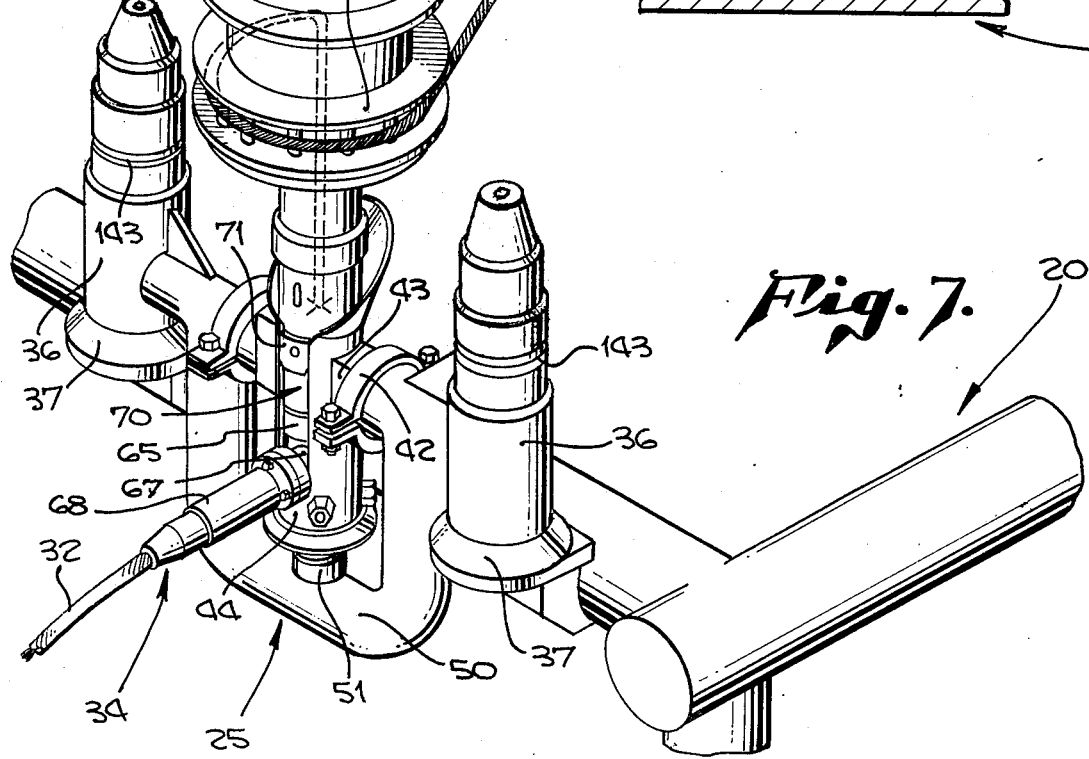

ABSTRACT
APPARATUS AND METHOD OF CONNECTING A FLEXIBLE LINE TO A SUBSEA STATION

BACKGROUND OF INVENTION

It is desired to locate subsea installations or stations on a sea floor at great water depths; that is, beyond the depth at which a diver may assist in the connection of the various well equipment and also beyond the depth at which diver capsules or submarines may be conveniently operated for such purpose. Subsea stations on the sea floor are remotely controlled; and to effect such control, it is necessary to bring electric cable or lines for power and control circuits to operate equipment on the subsea installation or equipment associated therewith at satellite subsea wellheads. Flexible cables or lines are often difficult to handle, quide, align and secure the end of a flexible bendable line to a fixed receptor on the subsea station.

Prior proposed apparatuses and methods for connecting an end of a flexible cable or line to a fixed receptor on a subsea station have usually required the assistance of a diver or of a robot having manipulator means for effecting such a connection. Such prior proposed systems, when employed at great water depths, were time-consuming and difficult to accomplish.

SUMMARY OF INVENTION

The present invention contemplates an apparatus and a method of connecting or attaching a flexible cable or line to a subsea station at virtually any depth of water and without assistance of divers or diver robots having manipulating means. The invention particularly relates to an apparatus for making such a connection and for a method or technique by which such a connection is reliably and effectively accomplished.

A primary object of the present invention is to provide an apparatus and a method for attaching and securing one end of a flexible cable to a subsea station.

An object of the present invention is to provide a guide frame structure adapted to carry a cable end having a connector receptacle thereon to the subsea station and to releasably connect the guide frame structure to said station.

An object of the invention is to provide such an electrical connector guide frame structure wherein socket container means are provided for pivotal movement relative to the frame structure whereby changes in position and loading imparted to the socket container by the flexible cable will normally not be transmitted to guide lines along which the frame structure moves during lowering thereof to the subsea station and whereby the frame structure is not subjected to forces which would tend to cause binding of the frame structure on the guide lines.

Another object of the present invention is to provide a novel method of making such an attachment or connection to a subsea station which includes the use of a running tool cooperable with the cable connector guide frame structure and whereby guide posts on the subsea station, the cable connect guide frame structure, and the running tool are cooperably associated in a novel manner.

A still further object of the present invention is to provide a novel construction of a running tool and cable connector guide frame structure whereby the guide frame structure may be conveniently lowered and associated with guide posts on the subsea station and may be retrieved when necessary for service and maintenance.

Various other objects and advantages of the present invention will be readily apparent from the following description of the drawings in which an exemplary embodiment of the apparatus and method of this invention is illustrated.

IN THE DRAWINGS

FIG. 1 is a schematic elevational view of a subsea station, a vessel above said station, and a cable laying vessel illustrating one step in the practice of the method of this invention.

FIG. 2 is a fragmentary enlarged perspective view of a portion of the subsea station and a guide frame structure and landing tool therefor in a position just before engagement with the subsea station.

FIG. 3 is an enlarged fragmentary sectional view taken in the plane indicated by line III — III of FIG. 2 and showing trunnion pivotal mounting means.

FIG. 4 is an enlarged fragmentary perspective view of a subsca station with the landing tool in retrieved position.

FIG. 5 is an enlarged fragmentary sectional view of the subsea station guide post, a guide funnel of the guide frame structure latched thereto and a latching arrangement for the running tool releasably latched to the guide funnel of the frame structure.

FIG. 6 is a fragmentary view similar to FIG. 5 with the latch mechanism of the running tool removed from the guide post and guide funnel assembly of the guide frame structure.

FIG. 7 is a fragmentary perspective view illustrating a completed electrical connection at the subsea station.

FIG. 8 is a fragmentary sectional view taken in the same plane as FIG. 3, but showing the trunnion member in cooperable locked position.

In FIG. 1 a subsea station is generally indicated at 20 and may include wellhead, production, and control modules (not shown). Subsea station 20 may be of the type shown in copending application Ser. No. 743,586 owned by a common assignee. Above subsea station 20 is positioned a vessel 21 having a derrick 22, a moon pool 23 below said derrick and through which a drill pipe string 24 may be extended to lower a cable connecting guide frame structure 25 to subsea station 20. Guide frame structure 25 is guided to guide posts 26 on station 20 by a pair of guide lines or cables 27 wound around constant tension winch means 28. The method of connecting each guide line 27 to the top of guide post 26 is accomplished by well-known means and is not part of this invention.

A cable laying vessel 30 includes a cable drum 31 around which cable 32 may be wound and stored. Cable 32 is fed from cable drum 31 over a stinger member 33 and has at its free end a cable receptacle means 34. Cable 32, in this example, is a flexible electrical cable carrying a plurality of circuits for control of certain operations at the subsea station 20. The other end of cable 32 is connected to a station remote from subsea station 20, such remote station may be a satellite wellhead, an offshore platform installation, or an onshore installation.

Guide frame structure 25 is best seen in FIGS. 2, 4 and 7. Frame structure 25 includes spaced guide sleeves 36 which receive the spaced guide posts 26. Guide sleeves 36 include outwardly flared bottom ends 37 to facilitate guiding of sleeves 36 onto post 26. Guide sleeves 36 are interconnected by a U-shaped frame portion 38 having outwardly turned top portions 39 welded to sleeves 36 and reinforced by suitable gussets 40. Outwardly turned end portions 39 at their interior ends provide pivotal mounting means 42 for trunnions 43 of a socket-like container means 44 pivotally movable about the mounting 42. Socket container means 44 includes a part-cylindrical hollow body 46 having a longitudinally extending slot 47 open at its top end and extending into proximity with the bottom end of socket container 44. The bottom end of socket container 44 carries an axial projection 48 which serves as a lock element when the socket container 44 is in a selected position, in this example a vertical position. Transverse member 50 of the U-shaped frame portion 38 is provided with a cylindrical collar 51 which defines a lock recess 52 for reception of lock element 48 as later described. The upper end of part-cylindrical body 46 is provided with an outwardly flaring truncated lip guide portion 54 to facilitate entry of equipment into socket container 44.

Pivotal mounting means 42 is schematically illustrated in FIGS. 3 and 8. In FIG. 3 mounting means 42 includes a key shaped chamber 56 having part-circular bearing surfaces 57 for rotatably supporting trunnion 43 which may have a generally elongated rectangular cross-section provided with arcuate end surfaces 58 and parallel flat side surfaces 59. Chamber 56 includes a key lock recess 60 adapted to receive a portion of trunnion 43 when the socket container 44 is vertically disposed and the major axis of the rectangular cross-section is likewise vertically disposed. Under such positioning of socket container 44, the projecting lock element 48 is aligned with a lock recess 52; and as shown in FIG. 8, the trunnions 43 will drop downwardly into the key lock recess 60 to thereby lock and hold socket container 44 in vertical position.

The capability of socket container 44 to pivotally move in pivotal mounting 42 when not in vertical position facilitates lowering of the frame structure 25 when the electrical cable 32 is carried thereby since the pivotally mounted socket container 44 will rotate or turn into inclined position, as shown in FIG. 1 and 2 to adjust to loads imposed thereon by cable 32 when cable 32 is connected to vessel 30 and the frame structure 25 is being lowered to the subsea station 20. It will be apparent that under some conditions during lowering frame structure 25 with electrical receptacle means 34 associated therewith, the socket container 44 is free to turn on its supporting trunnions, as long as socket container 44 does not move into vertical position. Thus, the frame structure 25 is relieved of any forces tending to tip the frame structure and cause possible binding of the sleeves 36 on the guide lines 27. Later, during laying of cable 32 on the sea floor, the socket container 44 is moved into vertical position and locked therein as above described.

Electrical receptacle means 34 may be a typical subsea electrical connector having a T head 65 slidably received within socket container 44, the stem of the T head having a flange 66 coupling with flange 66a on socket body member 68. Flange 66a defines a narrow neck portion 67 adapted to be received within slot 47. Flange 66, 66a secure the terminal socket body member 68 of cable receptacle means 34 to the T head 65. Connector 34 is secured in the lower portion of socket container 44 by a plurality of screw bolts 69 which extend through part-cylindrical wall 46 and interlock with the lowermost end portion of the T head 65. Connector 34 is thus fixedly secured to the socket container 44.

As best seen in FIG. 7, the upwardly directed end face of T head 65 mates with a plug assembly 70 having a key 71 on its outer surface for aligning engagement with slot 47 in the socket container 44. Plug assembly 70 is held in pressure engagement with the mating receptacle 65 by a container 72 filled with a heavy material, such as lead. Between container 72 and plug assembly 70 may be provided a cable reel 73 from which a suitable length of cable may be drawn for making the necessary connection to equipment on the subsea station.

Frame structure 25, with associated electrical receptacle connector 34 and the cable 32, may be landed and associated with the subsea station 20 in a novel manner. As noted in FIG. 1, cable receptacle 34 is fixedly associated with the socket container 44 on the frame structure at the vessel 21. Cable 32 is supplied from a reel 31 on cable laying vessel 30. Frame structure 25 is lowered along the constant tension guide lines 27 by a drill pipe string 24. When the frame structure 25 reaches the subsea station 20, guide sleeves 36 receive guide post 26. As shown in detail in FIG. 6, guide sleeves 36 are releasably latched to guide posts 26 and thereby provide means for retrieving the frame structure 25 and the associated cable receptacle 34 for service and maintenance.

In FIG. 6, each guide post 26 is provided with a locking recess 76 located in spaced relation to the top end of guide post 26. Each guide sleeve 36 is provided with a throughbore 78 having a downwardly facing annular shoulder 79 against which may be seated an internal annular member 80 secured by screw bolts 81 extending through the side wall of sleeve 36 into the annular member 80. The top surface of member 80 provides a seat for a compression spring 82 having its top end seated at 83 against a lock sleeve member 84 having an outer circumference slidably received within the upper internal portion 85 of bore 78. The lock sleeve 84 includes an enlarged chamber 86 defining sleeve walls of relatively thin section which terminate in a radially inwardly thickened end edge wall portion 87 having internal cam surfaces 88 for cammed engagement with enlarged lock heads 89 on a plurality of latch members 90 carried by annular member 80. Latch members 90 include relatively thin section tail portions 91 which are received between the exterior surface of guide post 26 and the spring 82. It will be apparent from FIG. 6 that frame structure 25 is locked on guide post 26 when assembled therewith and lock sleeve member 84 is biased by spring 82 to its upper position. In such position, the upper end of lock member 84 extends above sleeve 36 for contact with a running or landing tool 100 now described.

Landing or running tool 100 is shown in FIGS. 4 and 5 and includes a pair of spaced guide and locking cylindrical members 101 interconnected by a crossbar 102. Each cylindrical member 101 has an axial opening 103 for passage therethrough of guide line 27. Midway between guide cylinder members 101, crossbar 102 is provided with an upstanding mandrel 104 adapted to be releasably connected to a service connector means 105 carried by the lower end of drill string 24. Service connector 105 is provided with mechanically actuated latches 106 spaced 180° apart and which move into latched engagement with the mandrel as the service connector 105 is lowered thereover. A pressure fluid conducting tube 107 supplies hydraulic actuating fluid to release latches 106 in the event it is desired to separate running tool 100 from drill string 24 at the subsea station.

Each guide and locking cylindrical member 101 is adapted to be releasably connected to guide sleeves 36 on the frame structure 25. When connected with guide sleeves 36, running tool 100 through pipe string 24 may lower frame structure 25 to the subsea station or may retrieve frame structure 25 from the subsea station by actuating the latch means between the sleeve 36 and guide post 26 to a release position.

FIG. 5 shows running tool 100 engaged with the frame structure 25 and with the guide sleeve 36 in release position with respect to guide post 26. Guide and locking cylinder member 101 comprises a hollow cylindrical body 110 having a top cap 111 secured thereto by internal threaded engagement as at 112. Top cap 111 provides an inturned annular flange 113, which defines opening 103. The lower end of body 110 is provided with an internal annular portion 115 having a downwardly and outwardly flared conical surface 116 for seating as at 117 on a conical shoulder 118 provided on guide sleeve 36 to limit downward movement of running tool 100 with respect to frame structure 25. Internal annular member 115 is also provided with a conical seating surface 120 for engagement with a complementary conical surface 121 on each of a plurality of latch fingers 122 carried by and depending from an annular follower member 123.

Follower member 123 includes an inturned flange 124 defining an opening 125 for reception of the upper portion of guide post 26. Flange 124 provides a seat as at 126 for the lower end of a compression spring 127 which has an upper end seated as at 128 against the internal surfaces of inturned flange 113 of cap 111. Inturned flange 124 extends over the top edge of sleeve 36 and also over the top edge of lock sleeve 84 of the latching mechanism on the guide sleeve 36. In the position shown in FIG. 5, abutting contact at 130 of flange 124 with lock sleeve 84 illustrates the holding of lock sleeve member 84 in retracted position with spring 82 compressed and with the latches 89 in position for release from guide post 26 or for reception thereof.

Means for releasing running tool 100 from frame structure 25 and guide sleeves 36 includes a pressure fluid line 132 which may be carried along pipe string 24 and which may be extended through fluid conducting lines 133 to the latch release means provided at each lock cylinder member 101 on running tool 100. In FIG. 5, fluid pressure line 133 may be connected to the latch release means which comprise a cylinder 134 having a piston rod 135 therein pivotally connected at its upper and exposed end to a lug 136 secured by suitable means to a downwardly extending cylindrical wall 137 of follower member 124. Lugs 136 are provided at diametrically opposite positions on the follower 128 and each of the cylinder and piston means 134, 135 is provided with pressure fluid.

In FIG. 5, actuation of pistons 135 by introduction of pressure fluid into the lower portions of cylinders 134 will drive follower member 124 upwardly against the compression spring 127, lugs 136 being movable in longitudinal slots 138 provided in cylindrical body 110. As follower member 124 moves upwardly, the enlarged heads 140 of the latch fingers 122 are cammed radially outwardly into the space provided therefor by the thin wall section of the body member 110 so that the latch heads 140 may slide along the exterior surface of guide sleeve 36 for releasing the running tool from its interlocked engagement with the frame structure 25.

When the follower 124 has reached the uppermost position of its vertical travel in slots 138, it will be apparent that compression springs 82 within sleeve 36 have urged the lock sleeve member 84 into an upper position similar to that shown in FIG. 6 wherein the latch members 89 are retained in locked engagement with guide post 26. The running tool 100 may be thus retrieved and separated from the frame structure 25.

When it is desired to retrieve frame structure 25, running tool 100 may be lowered along the guide lines at 27 and will be guided over the guide post 26 by the outwardly flared surfaces 141 and the conical surfaces 116 of body member 110 which slidably contact the tapered or beveled edges on lock sleeve member 84 and on sleeve 36. As the follower member contacts the top edge portions of lock sleeve member 84, it will drive sleeve member 84 downwardly to compress spring 82 and to unlatch latches 89 from guide post 26. During the same downward movement, the spring 127 drives the follower downwardly so that the latch fingers 122 are moved into latched engagement with the annular recess 143 provided in the exterior surface of sleeve 36. When such latched engagement has been made with the sleeve 36, the frame structure 25 may be moved upwardly off guide posts 26 and retrieved for service of the electrical connector receptacle 34 and other equipment associated with frame structure 25. In connection with the above description of retrieval of frame structure 25, it will be understood that the container 72, reel drum 73 and associated plug assembly 70 will have been withdrawn by connection of a cable to cleat 144 provided on the top of container 72.

After cable connecting frame structure 25, carrying electrical connector 34, has been locked on guide posts 26 and thereby secured and fixed to the subsea station, the cable supply vessel 30 may move in the direction of the path along which the cable is to be laid on the sea floor. As cable 32 is paid out from the storage reel 31 and subjected to tension because of the cable laying operation, the socket container will be rotated to vertical position and dropped into locked relation with the cable connecting frame structure 25 as above described. The assembly of the plug means 70 and the weight container 72 with the socket container is readily accomplished by lowering the plug means and weight container by a running tool guided along guide lines 27. The plug means 70 is guided into aligned relation with the receptacle connector means 34 by its contact with the funnel 54 and engagement of key 71 in the longitudinal slot 47.

The interlocking and latching of the cable connecting frame structure 25 with guide posts 26 and also with running tool 100 during landing or retrieval of cable connecting structure 25 provides a remotely controlled assembly and disassembly of an electrical connector receptacle means with a subsea station.

It is important to note that the cable connecting assembly comprising the guide frame structure 25 and the pivotally mounted socket container thereon with its connection to one end of a flexible cable may be permanently fixed to the subsea station and yet may be readily released therefrom for repair, service or replacement. Retrieval of such a cable connector frame structure 25 is readily accomplished by the construction of the landing or running tool which is releasably attached to the frame structure 25 and also provides means for assuring that the frame structure 25 will be latched to the guide posts on the subsea station.

It will be understood that various modifications and changes may be made in the embodiment of the invention described above which come within the spirit of the invention and all such changes and modifications coming within the scope of the appended claims are embraced thereby.

We claim:

1. In a system for connecting a line having a connector on one end thereof to a subsea station having guide post means thereon, said guide post means being connected to guide lines leading to a first vessel positioned above said subsea station, said line to be connected being carried by a second vessel, the combination of:
    a connector guide frame means cooperable with said guide lines for movement between said guide post means and said first vessel;
    said connector guide frame means including socket means, said socket means having means for receiving and connecting thereto said connector on said one end of said line carried by said second vessel while said guide frame means is at the surface at said first vessel;
    and guide sleeve means carried by the connector guide frame, slideably cooperable with said guide lines, and releasably cooperable with said guide post means whereby said connector guide frame means is adapted to be lowered to said subsea station along said guide lines;
    means mounting said socket means on said connector guide frame means for pivotal movement in selected angular relation to said guide frame means whereby said connecting means with one end of said line attached thereto being yieldable relative to said connector guide frame means during lowering of said connector guide frame means to said subsea station;
    and means for locking said socket means in a preselected position when said connector guide frame means is at said subsea station;
    said socket means and said connecting means permitting connection of said connector with a means to be connected to said one end of said line when said guide frame means is at said preselected position at said subsea station.

2. In a system as stated in claim 1 wherein:
    said connecting means including a longitudinally extending slot on said socket means for guiding and aligning said connector and for guiding and aligning said means to be connected to said one end of said line.

3. In a system as stated in claim 1 including
    a running tool means releasably connected to said connector guide frame means for lowering said connector guide frame means to said subsea installation;
    releasable latch means interlocking said guide sleeve means and said guide post means;
    said releasable connecting means on said running tool means including latch means on said running tool interlocked with said guide sleeve means on said connector frame means.

4. In a system as stated in claim 3 wherein said latch means on said running tool is mechanically actuated into locked position.

5. In a system as stated in claim 4 wherein said latch means on said running tool includes means for holding said latch means on said connector frame means in release position when said running tool means is assembled with said connector frame means.

6. In a system as stated in claim 1 wherein
    said means for locking said socket means in said one position includes
    a depending lock pin on said socket container,
    and a recess on said connector guide frame means for reception of said lock pin in said one position of said socket means.

7. In a system as stated in claim 6 wherein said means for pivotal mounting of said socket means includes
    a pivot member on said socket means,
    and a part-circular bearing means for pivotal movement of said socket means about the axis of said part-circular bearing means and for downward displacement of said pivot member for engagement of said depending lock pin with said recess to lock said socket means in said one position.

8. In a system as claimed in claim 1 wherein means for pivotal mounting of said socket means includes
    trunnion means on said socket means;
    part-circular bearing means on said connector guide frame means providing a recess radially outwardly of said bearing means;
    said trunnion means having a non-circular cross section with one dimension of the trunnion means permitting reception of a portion of the trunnion means in said recess to hold said socket means against rotation in said one position for reception of the mating connector of the second line.

9. In a method of making an electrical connection of an electrical cable carried by a vessel to a subsea station below another vessel, guide lines extending between the subsea station and said another vessel, guide frame means slideably cooperating with said guide lines and including a socket container, said method including the steps of:
    placing an electrical receptacle means on said cable in said socket container at said other vessel;
    lowering the guide frame means and receptacle means along the guide lines to a subsea station;
    releasably attaching the socket container means to said subsea station;
    locking said socket container in a selected position with respect to said subsea station;
    lowering a plug assembly from said other vessel into said socket container in said selected position for electrical engagement with said receptacle means;
    and securing said plug assembly and receptacle means within said socket container in said selected position.

10. In a method as stated in claim 9 including the step of permitting rotative movement of said socket container when said socket container is not in said selected position.

11. In a method as stated in claim 9 wherein; the step of lowering said guide frame means and receptacle means to said subsea station includes
    lowering a running tool having interlocked engagement with said guide frame means supporting said socket container;
    and releasably connecting said running tool with a frame structure carrying said socket container.

12. In a method of making a connection to a subsea station wherein a line to be connected to the subsea station is carried by a first vessel and a second vessel is located above the subsea station and is provided with guide line means connected to the subsea station, guide frame means slideably cooperating with said guide lines, the steps of:
  connecting one end of said line to be connected on the first vessel to a connecting means on said frame means at the second vessel;
  said connecting means being mounted for pivotal movement in positions other than a final selected position;
  lowering said guide frame means with said one end of said line along said guide line means to said subsea station while permitting relative movement of said connecting means and said one end of said line to be connected;
  releasably attaching said guide frame means to said subsea station;
  and locking said connecting means in said final selected position by selected relative movement of said one end of said line to be connected with respect to said connecting means;
  whereby said one end of said line to be connected and said connecting means are fixedly positioned in a selected position for making a subsea connection to a mating line.

* * * * *

UNITED STATES PATENT AND TRADEMARK OFFICE
CERTIFICATE OF CORRECTION

PATENT NO. : 4,120,171

DATED : October 17, 1978

INVENTOR(S) : Georges M. Chateau et al.

It is certified that error appears in the above-identified patent and that said Letters Patent are hereby corrected as shown below:

Column 1, line 17, "quide" should read -- guide --.

Column 2, line 22, "subsca" should read -- subsea --.

Column 4, line 16, "receptable" should read -- receptacle --.

Signed and Sealed this

Fifteenth Day of May 1979

[SEAL]

Attest:

RUTH C. MASON
Attesting Officer

DONALD W. BANNER
Commissioner of Patents and Trademarks